United States Patent [19]

Hägglund

[11] Patent Number: 5,797,265
[45] Date of Patent: Aug. 25, 1998

[54] UTILIZATION OF LOW-VALUE HEAT IN A SUPERCHARGED THERMAL ENGINE

[76] Inventor: Thomas Hägglund, Skolhusgatan 40 A 9, FIN-65100 Vaasa, Finland

[21] Appl. No.: 661,159

[22] Filed: Jun. 10, 1996

[30] Foreign Application Priority Data

Jun. 12, 1995 [FI] Finland ................ 952869

[51] Int. Cl.$^6$ .................................................. F02B 29/04
[52] U.S. Cl. .................................................. 60/599
[58] Field of Search ........................ 60/599, 618; 123/563

[56] References Cited

U.S. PATENT DOCUMENTS

| | | |
|---|---|---|
| 3,439,657 | 4/1969 | Gratzmuller . |
| 4,182,127 | 1/1980 | Johnson ................ 60/618 |
| 5,415,147 | 5/1995 | Nagle et al. . |

FOREIGN PATENT DOCUMENTS

| | | |
|---|---|---|
| 0 035 822 | 9/1981 | European Pat. Off. . |
| 2 305 591 | 10/1976 | France . |
| 209674 | 5/1984 | German Dem. Rep. ............ 60/599 |
| 34 35 382 | 4/1986 | Germany . |
| 3439444 | 4/1986 | Germany ................ 60/599 |
| 34 44 433 | 6/1986 | Germany . |
| 2 033 017 | 5/1980 | United Kingdom . |

OTHER PUBLICATIONS

"10 MW Dual-Fuel Heat and Power Station", Diesel and Gas Turbine Worldwide, Taubert, Oct. 1981, vol. XIII, No. 8, pp. 42, 44 and 46.

Primary Examiner—Michael Koczo

[57] ABSTRACT

A power plant comprises a combustion engine having a supercharger for receiving low pressure feed air and delivering compressed feed air to the engine, a feed air heater for transferring low-temperature thermal energy from a heat source to the low pressure feed air, and a feed air cooler for recovering higher-temperature thermal energy from the compressed feed air.

15 Claims, 2 Drawing Sheets

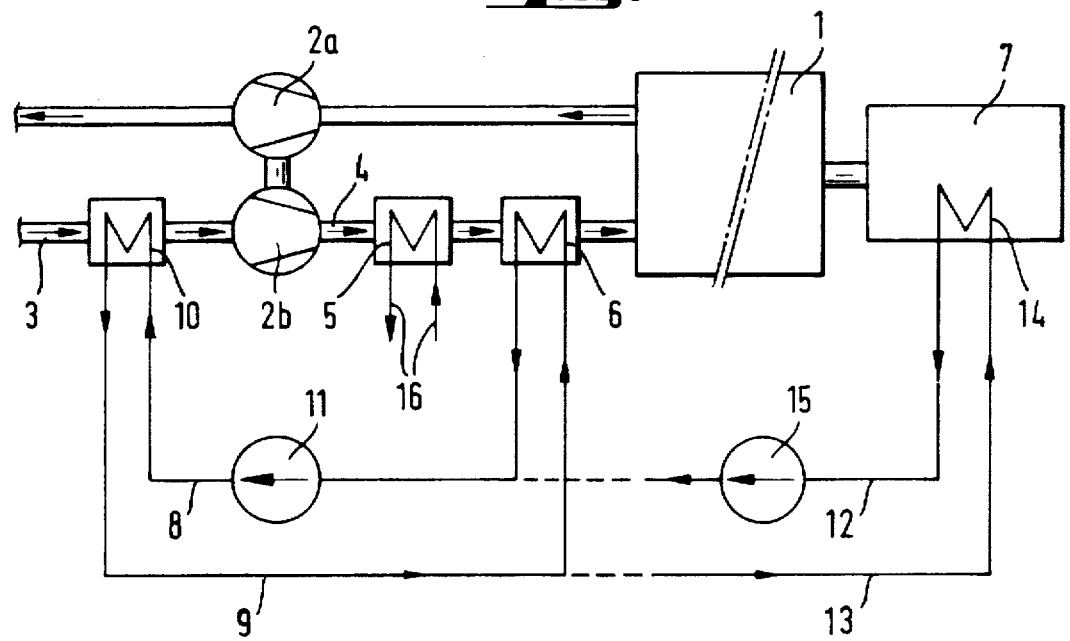
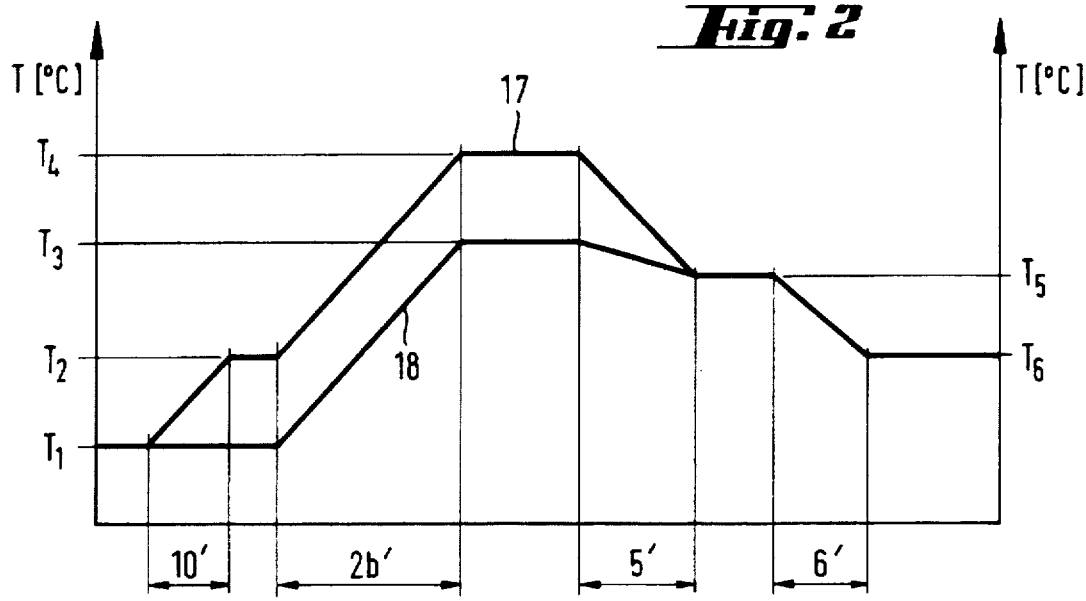

UTILIZATION OF LOW-VALUE HEAT IN A SUPERCHARGED THERMAL ENGINE

BACKGROUND OF THE INVENTION

The invention relates to an arrangement for utilizing low-value heat for improving the total efficiency rate of a supercharged thermal engine, such as a diesel engine. The invention is particularly applicable to a power plant. The term "power plant" as used in this specification means an arrangement which comprises a combustion engine that produces mechanical energy at a substantially constant power level and is connected to drive a secondary machine which converts the mechanical energy produced by the combustion engine to another form. There are several applications for such a power plant. For example, in an electricity generating power plant, the secondary machine is an electricity generator. In a marine propulsion power plant, the combustion engine is the ship's main propulsion engine and the secondary machine may be the ship's propulsion screw or an electric generator that drives an electric motor which in turn drives the propulsion screw. The operation of a power plant releases substantial quantities of thermal energy. Because the combustion engine produces mechanical energy at a substantially constant power level, a high degree of optimization of the operation of the engine, particularly in recovery of thermal energy, can be achieved.

Utilizing heat flows of a combustion engine for preheating or heating purposes or for driving auxiliary equipment is known. In such application it is of advantage to recover heat from high-temperature heat flows, such as exhaust gases or supercharged feed air. U.S. Pat. No. 4,182,127 discloses the utilization of several different heat sources. Finnish Patent Application No. 933126 (corresponding to U.S. patent application No. 08/566,128) discloses utilization of heat recovered from the hot coolant of an engine, from exhaust gases and from supercharged feed air. The latter document mentions that further, not specified cooling of the supercharged air supplied to a combustion engine is necessary for lowering its temperature, but nothing is said about any utilization of the heat recovered in this cooling process. This is because low-temperature heat of this kind is normally considered to be "low-value heat," that is heat that is not worth being utilized and therefore is left unutilized. This is harmful to the efficiency rate of the engine, because the temperature of the feed air remains disadvantageously high.

SUMMARY OF THE INVENTION

An object of the invention is to utilize available flows of low-value heat for improving the total efficiency rate of a combustion engine plant.

In accordance with a first aspect of the invention there is provided a power plant comprising a combustion engine having a supercharger for receiving low pressure feed air and delivering compressed feed air to the engine, a feed air heater for transferring low-temperature thermal energy from a heat source to the low pressure feed air, and a feed air cooler means for recovering higher-temperature thermal energy from the compressed feed air.

In accordance with a second aspect of the invention there is provided a method of operating a power plant that includes a combustion engine having a supercharger for receiving low pressure feed air and supplying compressed feed air to the engine, said method comprising transferring low-temperature thermal energy to the low pressure feed air, and recovering higher-temperature thermal energy from the compressed feed air.

Because heat is transferred to the feed air of a supercharged engine prior to leading the feed air to a turbocharger, or the like, the temperature of the air downstream of the charger is higher than without said heat transfer. Therefore, the heat of the supercharger feed air is more useful for utilization. Preheating of engine feed air according to the invention thus increases the amount of utilizable high-temperature heat. In this specification, the term high-temperature means a temperature that is higher than the temperature of the low-value heat referred to and suitable for known heat utilization purposes. Heat used for feed air preheating may be any low-value or waste heat, for example heat recovered from the same feed air downstream of the turbocharger. Its use for the purpose mentioned can only be of advantage and increase the total efficiency rate of the engine, because it decreases the temperature of the air fed into the engine to an extent that without applying the invention would not be at hand.

Improving the total efficiency rate of a power plant according to the invention, may be influenced by using heat from a medium flow cooling a machine powered by the prime mover of the plant, for example an electric generator. In particular in high power applications these medium flows contain substantial amounts of heat. Also, heat recovered from any cooling system of a combustion engine plant may be utilized for the same purpose. Heat exchangers are normally used for transferring heat from one fluid flow to another. The most efficient heat transfer is provided by heat exchangers working in the contra-flow mode.

The best results with respect to the total efficiency rate are normally achieved when several different heat sources are jointly used for preheating the feed air.

The invention is in particular suitable for improving the total efficiency rate of a power plant in which the combustion engine is a reciprocating internal combustion engine, for example a diesel engine. The diesel engine may be conventional, it may be an engine using heavy oil as fuel or a gas engine, possibly with spark ignition. It is of advantage that the thermal engine is quite big, having a mechanical power output of at least 0.5 MW, preferably at least 5 MW.

When, in an arrangement according to the invention, high-temperature thermal energy is taken from compressed feed air, the aim should be that only a small amount of residual thermal energy is left. It is recommended that the temperature of the residual thermal energy is at the most 85° C., preferably at the most 70° C.

High-temperature thermal energy recovered from the compressed feed air may advantageously be utilized in a district heating system or for other heating purposes. If the engine fuel is heavy oil, heat is also needed for fuel preheating. Another way of utilizing high-temperature thermal energy is to convert it to electricity by means of a steam turbine.

Normally, atmospheric air is used as feed air. Hence, the air temperature may vary considerably due to atmospheric conditions. Utilizing low-value heat is only possible when its temperature is higher than the temperature of the ambient air. In practice this means that the utilizable low-value heat temperature should be higher than 40° C.

BRIEF DESCRIPTION OF THE DRAWINGS

In the following, an embodiment of the invention will be described in greater detail with reference to the accompanying drawing, in which FIG. 1 is a schematic diagram of a diesel power plant according to the invention.

FIG. 2 shows temperature curves typical for an arrangement according to FIG. 1.

DETAILED DESCRIPTION

Figure 3:
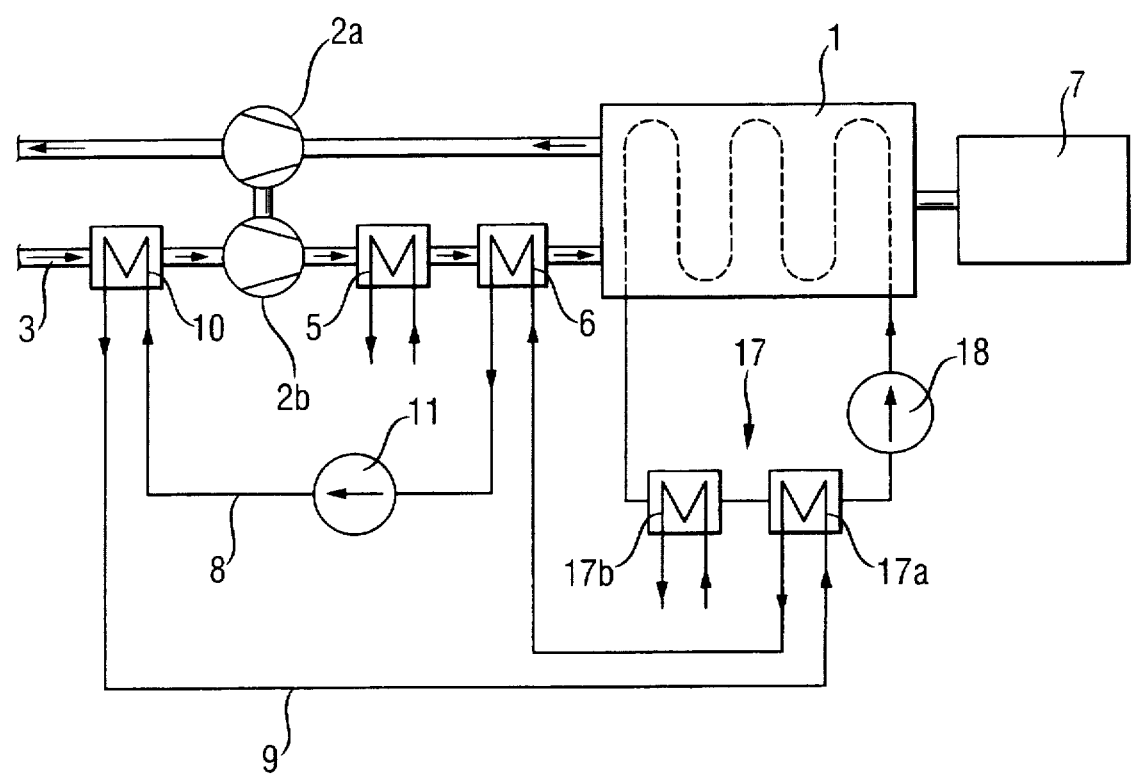
FIG. 3 is a schematic diagram of a modified form of the power plant shown in FIG. 1.

In the drawings, 1 indicates a diesel engine provided with a turbocharger comprising a compressor 2b driven by an exhaust gas turbine 2a. The turbocharger compresses the engine's feed air received through a pipe 3. Between the compressor 2b and the engine 1 the feed air passes through a pipe 4 to a heat exchanger 5, which may include one or several heat-exchanging stages and, preferably works in the contra-flow mode, as shown by arrows 16. The heat exchanger 5 recovers for utilization high-temperature thermal energy from the feed air that has been warmed up considerably due to the pressure rise provided by the compressor 2b. From the heat exchanger 5, the feed air is led to a cooler 6, which also works in the contra-flow mode. The cooler 6 thus delivers cooled supercharged feed air with a temperature of about 50° C. to the diesel engine 1. The engine 1 drives a generator 7 for production of electricity. Generally used heat recovery circuits for utilizing heat from the exhaust gases of the engine are not shown in the drawing.

Liquid containing pipes 8 and 9 connect the cooler 6 to a heat exchanger 10 working in the contra-flow mode for transferring low-value heat from the cooler 6 to the feed air to be delivered to the compressor 2b, thereby increasing the temperature of the air. A circulation pump 11 provides a desired liquid flow in the pipes 8 and 9. The temperature of the unprocessed feed air may vary significantly. If the engine operates in arctic conditions, the feed air temperature is typically the same or almost the same as the temperature of the ambient air. Because of freezing or humidity problems, it is sometimes necessary to preheat the air or give it some other treatment. In a warm climate, the temperature of the feed air may be +30° C. or even more. The temperature of the liquid contained in the pipe 9 is normally 20°–30° C., but it may vary considerably in different applications and under different atmospheric conditions. In the cooler 6, the temperature of the liquid coming in from the pipe 9 usually rises by 2°–20° C., but it may rise even more, especially, if the flow rate is low and/or if the cooler 6 works very efficiently as a heat exchanger.

FIG. 1 also shows a liquid cooler 14 connected to the cooling system of the generator 7. This cooler is connectable through pipes 12 and 13 to the described heat utilization arrangement. The coolers 14 and 6 may be connected in series or in parallel. By calculations it is possible to analyze which connection mode is more advantageous in each case. If necessary, a circulation pump 15 may be employed for ensuring the liquid flow through the heat exchanger 14 and for adapting the flow rate through the coolers 14 and 6 to a suitable value.

It is feasible to use, for the purpose described, any available low-value heat flow either alone or jointly with some other heat flow for heating the feed air upstream of the supercharger, thereby improving, according to the invention, the total efficiency rate of the arrangement.

In FIG. 2, the upper curve 17 shows the temperature of the feed air of a diesel engine in an arrangement according to the invention and the lower curve 18 shows the corresponding temperatures when the invention is not applied. The section 10' refers to the function of the heat exchanger 10, the section 2b' to the function of the turbocharger 2b, the section 5' to the function of the heat exchanger 5 and the section 6' to the function of the cooler 6. $T_1$ refers to the temperature of the feed air upstream of the heat exchanger 10. The temperature $T_1$ is normally less than 30° C., and even significantly less than 0° C. in arctic conditions. In an arrangement according to the invention, the feed air is warmed up in the heat exchanger 10 to the temperature $T_2$, which is about 40° C., but may also be higher. Without an arrangement according to the invention, the feed air would enter the compressor 2b at the temperature $T_1$ and would reach the temperature $T_3$, which usually is 200°–230° C., downstream of the compressor. When the invention is applied, the air is warmed up by the compressor 2b from the temperature $T_2$ to the temperature $T_4$, which is significantly higher than $T_3$ and normally above 240° C. In the heat exchanger 5, high-temperature heat is recovered for utilization.

The temperature $T_6$, usually 80°–90° C., is the temperature of the compressed feed air downstream of the heat exchanger 5, both when applying and not applying the invention. This means that, in an arrangement according to the invention, one may recover, in the heat exchanger 5, significantly more high-temperature heat for utilization than when not applying the invention. In the cooler 6, the temperature of the compressed feed air decreases to the temperature $T_5$, which is approximately the same when applying the invention and when not. Normally, the temperature $T_6$ is at the most about 50° C. It should be noted that FIG. 2 only refers to one application of the invention. Adjustment of the functional effectiveness of the cooler 6 and/or the heat exchanger 5 might give a more favorable result. The high-temperature heat recovered from the heat exchanger 5 is suitable for district heating, for preheating heavy oil, for steam generation and/or for other purposes of similar use.

FIG. 3 shows a modification of FIG. 1. As shown in FIG. 3, the engine 1 has a cooling system through which engine coolant circulates under control of a pump 18. The engine's cooling system includes a heat exchanger 17 for recovering thermal energy from the engine coolant. The heat exchanger includes a heat exchanger stage 17a for transferring thermal energy to the liquid circulated through the heat exchanger 5. The heat exchanger 17 may have a second stage 17b for transferring thermal energy to another fluid flow. Whether the stage 17a is a lower temperature stage than the stage 17b, as shown in FIG. 3, or a higher temperature stage, depends on which configuration is more favorable with regard to overall efficiency of the power plant.

The invention is not limited to the embodiments shown, but several modifications are feasible within the scope of the attached claims.

I claim:

1. A method of operating a power plant that includes a combustion engine, said method comprising:
   (a) transferring low-temperature thermal energy to a flow of low pressure air, thereby warming the flow of low pressure air,
   (b) compressing the flow of warmed low pressure air, whereby the temperature of thermal energy transferred to the flow of low pressure air is boosted to above 230° C.,
   (c) recovering boosted high-temperature thermal energy from the flow of compressed air and thereby cooling the flow of air, and
   (d) supplying the flow of cooled air to the engine as feed air,
   whereby a greater total quantity of thermal energy is recovered from operation of the engine.

2. A method according to claim 1, wherein step (c) comprises recovering high-temperature thermal energy from the compressed feed air including a temperature range around 240° C. and recovering residual low-temperature thermal energy from the compressed feed air including a temperature range between about 50° C. and about 80° C. after recovery of high-temperature thermal energy, and the method comprises transferring the recovered residual low-temperature thermal energy to the low pressure feed air in step (a).

3. A method according to claim 2, comprising using the high-temperature thermal energy recovered in step (b) for utility purposes.

4. A method according to claim 1, wherein the plant includes a machine that is connected for being driven by the engine and includes a cooling system, and step (a) comprises transferring low-temperature thermal energy at a temperature below 90° C. to the low pressure feed air from the cooling system of the machine.

5. A method according to claim 1, wherein the engine includes a cooling system and step (a) comprises transferring thermal energy at a temperature below 90° C. to the low pressure feed air from the cooling system of the engine.

6. A method according to claim 1, wherein step (a) comprises transferring thermal energy at a temperature below 90° C. to the low pressure feed air from a plurality of separate sources of low-temperature thermal energy.

7. A method according to claim 1, comprising operating the engine at a power output of at least 0.5 MW.

8. A method according to claim 1, wherein the temperature of the compressed feed air after step (c) is at the most 85° C.

9. A method according to claim 1, wherein the temperature of the low-temperature thermal energy is higher than 40° C.

10. A power plant comprising:

a combustion engine, a supercharger for receiving and compressing a flow of air and providing a flow of compressed air to the combustion engine, a high-temperature heat exchanger connected to receive high-temperature thermal energy from the compressed air leaving the supercharger, and a feed air heater for warming the flow of air entering the supercharger using low-temperature thermal energy from a heat source of considerably lower temperature than the temperature at which energy is received by the high-temperature heat exchanger from the compressed air leaving the supercharger, whereby the thermal energy is used for boosting the temperature of the compressed air leaving the supercharger to a temperature above 230° C. and a greater total quantity of thermal energy is recoverable from operation of the engine.

and wherein the power plant includes a machine that is connected for being driven by the engine and includes a cooling system and said heat source includes the cooling system of the machine.

11. A power plant according to claim 10, wherein the high-temperature heat exchanger recovers high temperature thermal energy from the compressed air including a temperature range around 240° C. for utility use, the power plant further comprises a low-temperature heat exchanger downstream of the high-temperature heat exchanger for recovering residual low-temperature thermal energy from the compressed air including a temperature range from about 50° C. to about 80° C., and said heat source includes the low-temperature heat exchanger.

12. A power plant comprising:

a combustion engine including a cooling system, a supercharger for receiving and compressing a flow of air and providing a flow of compressed air to the combustion engine, a high-temperature heat exchanger connected to receive high-temperature thermal energy from the compressed air leaving the supercharger, and a feed air heater for warming the flow of air entering the supercharger using low-temperature thermal energy from a heat source of considerably lower temperature than the temperature at which energy is received by the high-temperature heat exchanger from the compressed air leaving the supercharger, whereby the thermal energy is used for boosting the temperature of the compressed air leaving the supercharger to a temperature above 230° C. and a greater total quantity of thermal energy is recoverable from operation of the engine, and wherein said heat source includes the cooling system of the engine.

13. A power plant according to claim 12, wherein the high-temperature heat exchanger recovers high temperature thermal energy from the compressed air including a temperature range around 240° C. for utility use, the power plant further comprises a low-temperature heat exchanger downstream of the high-temperature heat exchanger for recovering residual low-temperature thermal energy from the compressed air including a temperature range from about 50° C. to about 80° C., and said heat source includes the low-temperature heat exchanger.

14. A power plant comprising:

a combustion engine, a supercharger for receiving and compressing a flow of air and providing a flow of compressed air to the combustion engine, a high-temperature heat exchanger connected to receive high-temperature thermal energy from the compressed air leaving the supercharger, and a feed air heater for warming the flow of air entering the supercharger using low-temperature thermal energy from a heat source of considerably lower temperature than the temperature at which energy is received by the high-temperature heat exchanger from the compressed air leaving the supercharger, whereby the thermal energy is used for boosting the temperature of the compressed air leaving the supercharger to a temperature above 230° C. and a greater total quantity of thermal energy is recoverable from operation of the engine, and wherein said heat source is composed of a plurality of separate sources of low-temperature thermal energy.

15. A power plant according to claim 14, wherein the high-temperature heat exchanger recovers high temperature thermal energy from the compressed air including a temperature range around 240° C. for utility use, the power plant further comprises a low-temperature heat exchanger downstream of the high-temperature heat exchanger for recovering residual low-temperature thermal energy from the compressed air including a temperature range from about 50° C. to about 80° C., and said heat source includes the low-temperature heat exchanger.

* * * * *

UNITED STATES PATENT AND TRADEMARK OFFICE
CERTIFICATE OF CORRECTION

PATENT NO. : 5,797,265

DATED : August 25, 1998

INVENTOR(S) : Thomas Hägglund

It is certified that error appears in the above-identified patent and that said Letters Patent is hereby corrected as shown below:

On the Title Page, insert Item [73] Assignee: --- WARTSILA DIESEL INTERNATIONAL LTD OY, Helsinki, Finland ---.

On the Title Page, delete "[76]" and insert --- [75] --- .

Signed and Sealed this

Third Day of April, 2001

*Attest:*

NICHOLAS P. GODICI

*Attesting Officer*  *Acting Director of the United States Patent and Trademark Office*